| United States Patent | [15] | 3,683,029 |
| --- | --- | --- |
| Dorrenbos | [45] | Aug. 8, 1972 |

[54] CHLORINATION PROCESS

[72] Inventor: Harold E. Dorrenbos, Midland, Mich.

[73] Assignee: The Dow Chemical Company, Midland, Mich.

[22] Filed: June 3, 1970

[21] Appl. No.: 43,183

Related U.S. Application Data

[63] Continuation-in-part of Ser. No. 724,635, April 26, 1968, abandoned.

[52] U.S. Cl.........260/612 R, 260/613 R, 260/644 R, 260/644 DP, 260/650 R
[51] Int. Cl...........................C07c 25/04, C07c 43/28
[58] Field of Search.260/649, 649 DP, 649 P, 650 R, 260/650 F, 651, 612 R

[56] References Cited

UNITED STATES PATENTS 3,271,465  9/1966  Krewer et al..............260/651

OTHER PUBLICATIONS

Ballester et al., J.A.C.S. 82 pp. 4,254– 4,258, 1960
Groggins, Unit Processes in Organic Synthesis, (1952) pp. 224

*Primary Examiner*—Howard T. Mars
*Attorney*—Griswold & Burdick, L. Wayne White and C. E. Rehberg

[57] ABSTRACT

$SCl_3AlCl_4$ reacts in solution to perchlorinate the nucleus of benzene, mono- or di-substituted perhaloalkyl benzenes and oligophenylenes. The perchlorinated compounds are chemical intermediates, monomers to heat-resistant polymers and extreme pressure lubricant additives.

11 Claims, No Drawings

CHLORINATION PROCESS

CROSS-REFERENCE TO RELATED APPLICATION

This application is a continuation-in-part of my co-pending application, Ser. No. 724,635, filed Apr. 26, 1968 and now abandoned.

BACKGROUND OF THE INVENTION

The invention herein described was made in the course of or under a contract with the Department of the Air Force.

Perchlorination of alkaromatic compounds is difficult because most reaction conditions for chlorination are sufficient to result in chlorinolysis, i.e. replacement of alkyl groups by chlorine.

A method of perchlorination is taught by M. Ballester, et al., J. Am. Chem. Soc., 82 4254 (1960), wherein a solution of $S_2Cl_2$, $AlCl_3$ and $SO_2Cl_2$ are reacted with perhaloalkyl-substituted benzenes. This method is industrially unsatisfactory because of the physical properties of sulfuryl chloride, $SO_2Cl_2$, and the necessarily large ratio of $SO_2Cl_2$ to perchlorinated product obtained.

The perchlorinated alkaromatic compounds have utility as monomers to heat-resistant polymers as taught by (a) M. Ballester, et al., J. Am. Chem. Soc., 88, 957 (1966) and (b) U.S. Pat. No. 3,360,574 and also have utility as extreme pressure lubricant additives when added to lubricating oils, such as mineral oil, in 1–5 percent concentrations.

SUMMARY OF THE INVENTION

It has now been discovered that $SCl_3AlCl_4$, in solution, per chlorinates the nucleus of compounds of the formulae

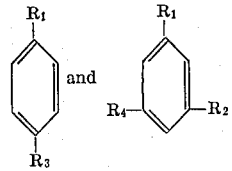

wherein $R_1$, $R_2$, $R_3$ and $R_4$ are each independently hydrogen, halogen, perhaloalkyl of 1-3 carbon atoms,

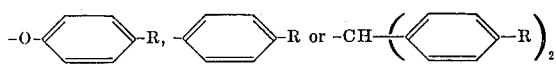

wherein R is hydrogen, halogen or perhaloalkyl of 1 to 3 carbon atoms. Suitable such materials include benzene, trichloromethylbenzene, p-bis(trichloromethyl)benzene, m-bis(trichloromethyl)benzene, biphenyl, 4-trichloromethylbiphenyl, 4,4'-bis(trichloromethyl)biphenyl, chlorobenzene, 1,4-dichlorobenzene, 1,3-dichlorobenzene, bromobenzene, 1,4-dibromobenzene, triphenylmethane, diphenylether and other like compounds.

$SCl_3AlCl_4$ is a solid, very reactive with water and alcohols and therefore is handled in substantially anhydrous conditions for best results, and is prepared according to the method taught by O. Ruff and H. Golla, Zeit anorg. allgem. Chem., 138, 17 (1924) or as illustrated hereinafter.

The chlorination process may be run in any solvent so long as the solvent is liquid under the process conditions and is inert to the chlorinating agent $SCl_3AlCl_4$. Suitable inert solvents, for example, are chlorinated (generally perchlorinated) or oxychlorinated derivatives of the elements in groups 4a, 5a, 6a, 4b, 5b and 6b in the Periodic Table of the Elements. Suitable solvents, therefore, include perchlorinated aliphatic hydrocarbons, such as $CCl_4$, $Cl_2C=CCl_2$, $Cl_3C—C(Cl)=CCl_2$, bis(trichloromethyl) ether, phosgene, and the like, $SiCl_4$, $Si_2OCl_6$, $GeCl_4$, $SnCl_4$, $PCl_3$, $POCl_3$, $P_2O_3Cl_4$, $AsCl_3$, $SbCl_3$, $SbCl_5$, $SCl_2$, $SOCl_2$, $SO_2Cl_2$, $SeCl_2$, $SeOCl_2$, $TiCl_4$, $VCl_4$, $VOCl_3$, $CrO_2Cl_2$ and the like. Preferred solvents are perchlorinated aliphatic hydrocarbons or the perchlorinated or oxychlorinated derivatives of phosphorus or sulfur. The most preferred solvents are $CCl_4$, $SOCl_2$ or $SO_2Cl_2$. This preference is based on (1) the increased solubility of $SCl_3AlCl_4$ in $SOCl_2$ as compared to $SO_2Cl_2$ and $CCl_4$ (2) the relative ease of handling and (3) the economics of using $CCl_4$.

The concentration of $SCl_3AlCl_4$ in solution may be adjusted to convenience but a highly concentrated solution is preferred. This solution may be prepared by (1) mixing $SCl_3AlCl_4$ with the solvent or (2) by reacting $SCl_2$ with $Cl_2$ and $AlCl_3$ to yield $SCl_3AlCl_4$ in situ. The latter preparation may be in a solvent or neat.

The mole ratio of reactants may be varied between 0.2–1.4 moles of $SCl_3AlCl_4$ per atom of hydrogen to be replaced. If one uses less than a 1:1 ratio of reactants, the same degree of chlorination is obtained but at a lower rate. It is preferred to have an additional quantity of $Cl_2$ present in the mixture, especially when less than a 1:1 ratio of reactant is used. One postulates that the $Cl_2$ reacts with a species such as $SCl^+AlCl_4^-$ to regenerate the chlorinating agent $SCl_3^+AlCl_4^-$ in situ.

The reaction temperature is suitably from 50°–110° C. and preferably from 70°–90° C. This preference is based on (1) kinetic data and (2) the fact that increasing amounts of decomposition are observed at temperatures above 100° C.

The pressure used depends on the solvent and is conveniently atmospheric with $SO_2Cl_2$, and autogenous with $SOCl_2$ and $CCl_4$. The preferred pressure is autogenous and includes the partial pressure of $Cl_2$.

GENERAL PROCEDURE

Mix the material to be chlorinated with $SCl_3AlCl_4$ in solution. Adjust the reaction temperature to about 50°–110° C. with stirring and maintain the reaction mixture at this condition until substantial amounts of chlorinated product are produced. If desired, free chlorine may be put in initially or fed in during the reaction. The product is then isolated by removal of the solvent under reduced pressure, treating the residue with water and filtering the aqueous mixture to obtain the residual product.

SPECIFIC EMBODIMENT

The following examples are used to further illustrate the invention.

PREPARATION OF SCl$_3^+$AlCl$_4^-$

To 8.36 g. (0.081 mole) of SCl$_2$ in one leg of an H-shaped glass container was added 5.77 g. (0.081 mole) of liquid Cl$_2$. After mixing the two reactants at −80° C., 10.87 g. (0.081 mole) of anhydrous AlCl$_3$ was added under a N$_2$ blanket. The mixture was shaken and stored overnight at −80° C. The yellow-orange crystals which formed were extracted with distilled SO$_2$Cl$_2$ to leave light yellow to white crystals of SCl$_3^+$AlCl$_4^-$ which decomposed at 120° C.

EXAMPLE 1

Preparation of perchloro-p-xylene

Into a dry, heavy-walled 300 ml. glass tube was charged 5.35 g. (0.052 mole) of SCl$_2$. The tube was placed in a bath at −78° C. and 32 g. (0.45 mole) of chlorine gas was condensed onto the SCl$_2$. The mixture was stirred magnetically for 5 minutes. Then 6.73 g. (0.055 mole) of anhydrous AlCl$_3$ was added to the stirred mixture. Stirring was continued for 10 minutes. A total of 20.0 g. (0.064 mole) of 1,4-bis(trichloromethyl) benzene was added to the mixture along with 100 ml. of SOCl$_2$. The tube was sealed off under a N$_2$ blanket and the contents allowed to warm to room temperature. The tube was placed in an iron pipe and immersed in an oil bath at 80° C. for 24 hours. The tube was then cooled and opened, and the SOCl$_2$ was removed under vacuum. The solid residue remaining was washed with water. The resulting yellow crystals were dried and recrystallized from methylene chloride and petroleum ether. A total of 21.8 g. (76 percent of the theoretical yield) of decachloro-p-xylene was obtained. The remaining white product was octachloro-p-xylene.

EXAMPLE 2

Preparation of Perchloro-p-bitolyl

Using

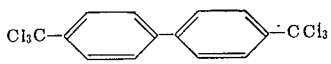

as the hydrocarbon substrate and following substantially the procedure of Example 1, 74 percent of the theoretical yield of perchloro-p-bitolyl was obtained.

EXAMPLE 3

Preparation of Perchloro-triphenylmethane

Using

as the hydrogen substrate and following substantially the procedure of Example 1, 51.3 percent of the theoretical yield of perchloro-triphenylmethane was obtained.

EXAMPLE 4

Preparation of Perchloro-p-bitolyl

Into a 300 ml. glass tube was placed 15.0 g. of the anhydrous complex, SCl$_3^+$AlCl$_4^-$. To this was added 95 g. of liquid chlorine, 20.0 g. of 4,4'-bis(trichloromethyl)diphenyl, and 100 ml. of thionyl chloride. The tube was sealed, placed in an oil bath at 78° C. and stirred for 88 hours under autogenous pressure. At the end of this time the cooled tube was opened, the solvent removed under reduced pressure, and the residue treated with water and filtered. The dried residue yielded 25.7 g. (67 percent of the theoretical yield) of crystalline product when recrystallized from methyl isobutyl ketone.

EXAMPLE 5

Preparation of Decachloroxylene

Using 15 g. of the complex, SCl$_3^+$AlCl$_4^-$, and 10 g. of 1,4-bis(trichloromethyl)benzene in 600 ml. of sulfuryl chloride (SO$_2$Cl$_2$), the reaction mixture was refluxed for 24 hours at atmospheric pressure. The product was worked up in the usual way. A total of 74 percent of the theoretical amount of the decachloroxylene was obtained in this manner.

I claim:

1. A process of perchlorinating the nucleus of aromatic compounds comprising reacting by contacting SCl$_3$AlCl$_4$ with a compound of the formula

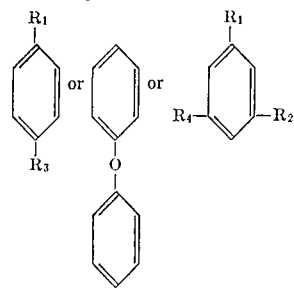

wherein R$_1$, R$_2$, R$_3$ and R$_4$ are each independently hydrogen, chloro, bromo, perhaloalkyl of 1 to 3 carbon atoms,

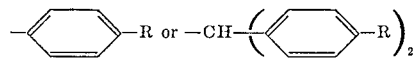

and wherein R is hydrogen, chloro, bromo or perhaloalkyl of 1 to 3 carbon atoms, at a temperature between 50°–110° C. and in a reaction solvent inert to the chlorinating agent SCl$_3$AlCl$_4$; said solvent being a perchlorinated aliphatic hydrocarbon, a perchlorinated derivative of phosphorus, sulfur, silicon, germanium, tin, arsenic, antimony, selenium, titanium or vanadium or an oxychlorinated derivative of phosphorus, sulfur, silicon, selenium, vanadium or chromium.

2. The process defined in claim 1 wherein the reaction temperature is 70°–90° C.

3. The process defined in claim 2 wherein about 0.2–1.4 moles of SCl$_3$AlCl$_4$ are used per atom of hydrogen to be replaced and wherein the reaction solvent is SO$_2$Cl$_2$, SOCl$_2$ or CCl$_4$.

4. The process defined in claim 1 wherein the reaction solvent is a perchlorinated aliphatic hydrocarbon; or a perchlorinated or oxychlorinated derivative of phosphorus or sulfur.

5. The process defined in claim 1 wherein about 0.2–1.4 moles of $SCl_3AlCl_4$ are used per atom of hydrogen to be replaced.

6. The process defined in claim 1 wherein the reaction solvent is $CCl_4$, $Cl_2C = CCl_2$, $Cl_3C—C(Cl) = CCl_2$, bis(trichloromethyl)ether, phosgene, $SiCl_4$, $Si_2OCl_6$, $GeCl_4$, $SnCl_4$, $PCl_3$, $POCl_3$, $P_2O_3Cl_4$, $AsCl_3$, $SbCl_3$, $SbCl_5$, $SCl_2$, $SOCl_2$, $SO_2Cl_2$, $SeCl_2$, $SeOCl_2$, $TiCl_4$, $VCl_4$, $VOCl_3$, or $CrO_2Cl_2$.

7. The process defined in claim 1 wherein the reaction solvent is $SO_2Cl_2$, $SOCl_2$, or $CCl_4$.

8. The process defined in claim 1 wherein $R_1$, $R_2$, $R_3$ and $R_4$ are each independently hydrogen, chloro, $—CCl_3$,

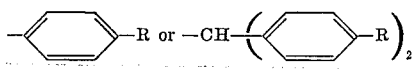

wherein R is hydrogen, chloro or $—CCl_3$.

9. The process defined in claim 8 wherein $R_2$ and $R_4$ are each hydrogen.

10. The process defined in claim 9 wherein R is hydrogen.

11. The process defined in claim 10 wherein $R_3$ is hydrogen.

* * * * *